United States Patent [19]

Cohen

[11] Patent Number: 4,995,714

[45] Date of Patent: Feb. 26, 1991

[54] MULTIFOCAL OPTICAL DEVICE WITH NOVEL PHASE ZONE PLATE AND METHOD FOR MAKING

[76] Inventor: Allen L. Cohen, 10010 Walsham Ct., Richmond, Va. 23233

[21] Appl. No.: 456,228

[22] Filed: Dec. 22, 1989

Related U.S. Application Data

[63] Continuation of Ser. No. 237,292, Aug. 26, 1988, abandoned.

[51] Int. Cl.[5] .................. G02C 7/04; G02B 27/44; G02B 3/08; A61F 2/16

[52] U.S. Cl. .................. 351/161; 350/162.16; 350/162.22; 350/437; 350/452; 351/168; 351/177; 623/6

[58] Field of Search ............ 350/452, 162.16, 162.22, 350/437; 623/6; 351/161, 159, 168–172, 177

[56] References Cited

U.S. PATENT DOCUMENTS

| | | | |
|---|---|---|---|
| 3,004,470 | 10/1961 | Ruhle | 350/452 |
| 4,162,122 | 7/1979 | Cohen | 251/161 |
| 4,210,391 | 7/1980 | Cohen | 351/161 |
| 4,338,005 | 7/1982 | Cohen | 351/161 |
| 4,340,283 | 7/1982 | Cohen | 351/161 |
| 4,637,697 | 1/1987 | Freeman | 351/161 |
| 4,641,934 | 2/1987 | Freeman | 351/159 |
| 4,642,112 | 2/1987 | Freeman | 351/161 |

FOREIGN PATENT DOCUMENTS 602918 10/1958 United Kingdom .
1154360 6/1969 United Kingdom .

OTHER PUBLICATIONS

Ziegler, J. F.; "Fabrication or Correction of Optical Lenses"; *IBM Technical Disclosure Bulletin;* vol. 12; No. 10; Mar. 1970; pp. 1573–1575.
Walsh, A., "Echelette Zone Plates for Use in Far Infrared Spectroscopy", Journal of the Optical Society of America, Mar. 1952.
Klein et al., "Multizone Bifocal Contact Lens Design", SPIE, Aug. 1986.
Tudorovskii, "An Objective With a Phase Plate", Optics and Spectroscopy, Feb. 1959.
Forst, Guntar, "Investigations Into the Usability of Circular Gratings as Vision Aids", Augenoptiker, Dec. 12, 1966.
Myers, "Studies of Transmission Zone Plates", JOSA, vol. 19, 1951.
Miyamoto, "The Phase Fresnel Lens", Journal of the optical Society of America, vol. 51, No. 1, Jan. 1961.
Waldman, "Varations of the Fresnel Zone Plate", Journal of the Optical Society of America,-vol. 56, No. 2, Feb. 1966.
Horman et al., "Zone Plate Theory Based on Holography", Applied Optics, vol. 6, No. 2, Feb. 1967.
Stigliani et al., "Resolving Power of a Zone Plate", Journal of the Optical Society of America, vol. 57, No. 5, May 1967.
Chau, H. H. M., "Zone Plates Produced Optically", Applied Optics, vol. 8, No. 6, Jun. 1969.
Jordan et al., "Kinoform Lenses", Applied Optics, vol. 9, No. 8, Aug. 1970.
Bottema, M., "Fresnel Zone-Plate Diffraction Patterns", Journal of the Optical Society of America, vol. 59, No. 12, Dec. 1969.
Young, M., "Zone Plates and Their Aberrations", Journal of the Optical Society of America, vol. 62, No. 3, Aug. 1972.
Kleinhans, W. A., "Aberrations of Curved Zone Plates and Fresnel Lenses", Applied Optics, vol. 16, No. 8, Jun. 1972.
Gomez-Reino et al., "Placas ZOnales de Amplitud y Fase: Teoria y Realizacion Experimental", Optica Pura y Aplicada, vol. 10, 1977.
Vereshchagin et al., "Chromatic Properties of Profiled Zone Plates; Continuation", Opt. Spectrosc. (USSR), 47(1), Jul. 1979.
Kyuragi et al., "Higher-Order Suppressed Phase Zone Plates", Applied Optics, vol. 24, No. 8, 15 Apr. 1985.
Fincham et al., "Optics", Butterworths, London, 9th ed., 1980, pp. 72–75.

*Primary Examiner*—Scott J. Sugarman
*Attorney, Agent, or Firm*—Finnegan, Henderson, Farabow, Garrett & Dunner

[57] ABSTRACT

A diffractive multifocal optical element comprising a phase zone plate of a Cohen lens design containing rotationally symmetrical, curved repetitive patterns designed to operate at a specific wavelength and which are also curved in $r^2$ space.

17 Claims, 6 Drawing Sheets

MULTIFOCAL OPTICAL DEVICE WITH NOVEL PHASE ZONE PLATE AND METHOD FOR MAKING

This application is a continuation, of application Ser. No. 07/237,292 filed Aug. 26, 1988, now abandoned.

RELATED APPLICATIONS

Commonly owned U.S. application Ser. No. 863,069, filed May 14, 1986, U.S. application Ser. No. 222,000 now abandoned, filed on July 20, 1988, and U.S. application Ser. Nos. 120,265 now U.S. Pat. No. 4,881,804 and 120,262, now U.S. Pat. No. 4,881,805 both filed Nov. 12, 1987.

BRIEF DESCRIPTION OF THE INVENTION

A diffractive multifocal optical element comprising a phase zone plate of a Cohen lens design containing rotationally symmetrical, curved repetitive patterns designed to operate at a specific wavelength and which are also curved in $r^2$ space. In particular, the invention embraces a diffractive multifocal optical element comprising a phase zone plate of a Cohen lens design, i.e., containing rotationally symmetrical repetitive patterns designed to operate at a specific wavelength which are periodic in accordance with $\sqrt{n}$ spacing, which (a) have curved profiles that are also curved in $r^2$ space, (b) contain modulations within the pattern sufficient to introduce a phase shift in the optical path of about $\lambda/8$ or more, where $\lambda$ is the designed wavelength, and (c) are correlated such that the light intensity at two focal points comprise, for each focal point, at least 20 percent of the incoming light at $\lambda$, and the ratio of the intensities at the two focal points is between about 0.5 and 2.00.

BACKGROUND TO THE INVENTION

This invention relates to an improvement in phase zone plate optics embracing contact and intraocular lenses. A "phase zone plate", as employed herein and in the claims, is a unitary optical region of a lens utilizing the combination of a zone plate and optical facets (such as in the form of echelettes) in the zones of the zone plate, and the combined facets in the zones diffract light to produce a specific wavefront which results in a specific intensity distribution of light at a variety of orders (e.g., $0^{th}, 1^{st}$, etc.) of the zone plate. The orders constitute the foci of the zone plate. In a restrictive sense and also in the most utilitarian sense, the phase zone plate is designed for general lens applications where the distribution of light at effective intensities is dependent upon zone spacing for yellow light. Yellow light, as employed herein, is that portion of the visible spectrum at 530–570 manometers.

The invention relates inter alias to contact lenses. Contact lenses are classical vergence type lenses. They possess a concave corneal bowl (the posterior surface) that allows fitting to the eye and the outer surface (the anterior surface) is smooth and shaped to allow the eyelid to slide over the eye and to provide proper vergence of light (taking the lens material's refractive index into consideration) to a focal point accommodating to the eye. The majority of the commercial contact lenses are shaped such that the lenses are thinnest about the optical axis and the depth of the lenses gradually increases along a sloped radial length extending in the direction of the lens perimeter. Owing to the difference in depth extending from the optical axis, light passing through the optical axis has to pass through less of the lens material. Because light travels faster in air, the light passing through greater depth relative to light passing through lesser depths will be shifted, hence be retarded in time.[1] Consequentially, the shape of the lens is selected to accommodate this progressive retardation of the light so that the lightwaves emanating from the posterior surface are in synchronization in reaching a desired focal point.

[1]. See Fincham et al., *Optics*, published by Butterworths, London, 9th edition, 1980, 1981, pp. 72–75.

This invention concerns contact lenses utilizing phase zone plate optics, such as phase zone plate bifocals and "tuned" Fresnel lenses making use of concentric annular zones. Such lenses generally follow the designs described, for example, by Allen L. Cohen in U.S. Pat. Nos. 4,210,391; 4,338,005; and 4,340,283 ("Cohen patents"). A Cohen lens design provides that the radii "$r_n$" of the annular and concentric zones are substantially proportional to $\sqrt{n}$ and that the zones are cut so as to direct light to more than one focal point.

Prior to the work of Cohen, the analyses provided by Fresnel and Wood demonstrated that every full-period zone of a phase zone plate comprises two half-period zones (odd and even zones) which are sufficiently out of phase to destructively interfere at the $1^{st}$ order focal point. They taught that by blocking an odd or even zone out or phase shifting the light from an odd to even zone, destructive interference is minimized. However, this did not result in a useful bifocal lens. Cohen found that by making the odd and even zones different and thereby directing light differently, the incident parallel light passing through the zones would be coordinated to form a diffraction limited element that directs the light to different focal points thereby providing a useful multifocal lens. The differences in the odd and even zones are accomplished by variations in thickness or refractive index in and between the zones.

The Cohen lens design with phase zone plate optics allows bifocal lens constructions which are exceptionally thin. Contact lenses may be designed with phase zone plate optics in order to achieve a bifocal or other multifocal effects. The specific chromatic properties of a phase zone plate may be incorporated in the design of a contact lens including a contact lens having multifocal properties. All phase zone plate optical elements which are designated bifocals are possessed inherently with the ability to focus light to more than two focal points. They are designated bifocals because the intensity levels of the light to any two orders, e.g., the $0^{th}$ and $1^{st}$ order focal points are adequate for bifocal applications. In that sense, every bifocal distributes light to a third, and possibly more, focus. The judgment of whether a lens is a bifocal or trifocal is not base on any strict rule. If the wearer of the lens does not find objectionable the presence of the third or more focuses, then the lens is probably adequate as a bifocal.[2]

[2]. See Klein and Ho, *SPIE*, August 1986, Table 2 and the comments about Table 2.

Other references mentioning or suggesting phase zone plate optics in regards to contact lenses are G. Forst, "Research into the Usability of Circular Grids as Aid to Vision," Der Augenoptiker, 1966 (12), pages 9–19; Ziegler, "Fabrication or Correction of Optical Lenses," as modified by Cohen, see column 4, lines 27–36 of Cohen, U.S. Pat. No. 4,339,005, and column 5, line 63 to column 6, line 68, Cohen, U.S. Pat. No.

4,210,391; Freeman, U.S. Pat. No. 4,637,697; and Freeman, U.S. Pat. No. 4,642,112 (to the extent that holography embraces phase zone plate optics).

Bifocal contact lenses utilizing the above principles of phase zone plate optics are commercially available. Such lenses are believed to utilize parabolically-profiled, stepped annular facets each comprising a full-period zone where each zone has a depth of an optical path length of $\lambda/2$, providing a physical depth of $\lambda/2$ $(\eta'-\eta)$. $\eta'$ and $\eta$ are the indices of refraction of the lens and the medium (e.g., lachrymal layer) in which the lens is interacting and $\lambda$ is the design wavelength, in this case that of yellow light. This results in a bifocal contact lens where the $0^{th}$ and $1^{th}$ orders have an equal split of yellow light intensity at about 40.1%.

A full-period zone, for purposes of this invention, is defined as the smallest repetitive sequence of facets within a phase zone plate which are spaced substantially proportional to $\sqrt{n}$. Such spacing is characterized by the formula:

$$r_n \simeq \sqrt{2nd\lambda}$$

where d represents the $1^{st}$ order focal length. A half-period zone, for the purposes of this invention, is characterized by the formula:

$$r_n \simeq \sqrt{nd\lambda}$$

where d represents the $1^{st}$ order focal length.

If one were to alter the depth of the steps of this lens design there would result in vastly different concentrations of intensity of the incoming light to the focal points. For example, a phase zone plate with full-period spacing of the echelettes where the depth of the step of each echelette is $\lambda$, and the profile of the echelette is parabolic, using the wavelength of yellow light as the design wavelength, the resulting lens is essentially monofocal to the $1^{st}$ order to the user regardless of the shape of the carrier lens overall. As the depth of this step is reduced, the flattening out of the echelettes results in different variations in depth over this spacing consequently effecting the differential shaped odd and even zones of Cohen. With a depth greater than $\lambda/2$, the intensity of light at the $1^{st}$ order is significantly greater than at the $0^{th}$ order because the thickness differences between the odd and even zones are high. It is only when the depth of the echelettes are $\lambda/2$ that the lens provides uniform light intensities at the $0^{th}$ and $1^{st}$ orders. Here the thickness differences between the odd and even zones are balanced. When the depth of the echelettes fall below $\lambda/2$, the thickness differences between the odd and even zones becomes minimized and this results in greater light intensity at the $0^{th}$ order.

What is lacking in the art is flexibility to vary the depth of the steps yet retain a desirable split of the intensity of the light to the $0^{th}$ and $1^{st}$ orders or any other multiple order combinations. It would be desirable to have the ability of generate multifocal, especially bifocal, lenses in which the depth of the echelette may be a variable factor in lens design, yet the lens designer has the capacity to make a lens which has a favorable split of light to the $0^{th}$ and $1^{st}$ orders or any other combination of orders.

There is described herein a lens design which employs phase plate optics yet is freed of the constraints of facet structure to the parabolic profile. The lens design of this invention allows the lens manufacturer to make a lens, especially a contact lens, that utilizes a wide selection of echelette configurations yet allows the manufacturer to achieve a desired split of light to the near and far focal points. This flexibility in lens design frees the lens manufacturer from such constraints in lens design as echelette depth, traditional parabolic or flat profiles, and the like considerations.

SUMMARY OF THE INVENTION

This invention relates to a diffractive multifocal optical element comprising a phase zone plate of a Cohen lens design containing rotationally symmetrical, curved repetitive patterns designed to operate at a specific wavelength and which are also curved in $r^2$ space. In another aspect, this invention relates to a diffractive multifocal optical element comprising a phase zone plate containing rotationally symmetrical repetitive patterns (i.) designed to operate at a specific wavelength and (ii.) which (a) are periodic in accordance with $\sqrt{n}$ spacing, (b) have curved profiles that are also curved in $r^2$ space[3],

[3]. It is pointed out that a parabolic curved profile would be linear and not curved in $r^2$ space.

(c) contain modulations within the pattern sufficient to introduce a phase shift in the optical path of about $\lambda/8$ or more, where $\lambda$ is the designed wavelength, and (d) are correlated such that the light intensity at two focal points comprise, for each focal point, at least 20 percent of the incoming light at $\lambda$, and the ratio of the intensities at the two focal points is between about 0.5 and 2.00.

The invention may also be characterized by a diffractive multifocal optical element comprising a phase zone plate of a Cohen lens design containing correlated rotationally symmetrical, curved repetitive patterns designed to operate at a specific wavelength, which curved repetitive patterns are curved as well in $r^2$ space and the variability in thickness or the refractive index of the repetitive patterns are correlated such that the light intensity at two focal points comprise, for each focal point, at least 20 percent of the incoming light at $\lambda$, and the ratio of the intensities at the two focal points is between about 0.5 and 2.00.

One embodiment of the invention is directed to an ophthalmic contact lens containing at least two phase zone plates within its optic zone, at least one of which embraces the features of the aforementioned optical elements.

Another embodiment of the invention is directed to an ophthalmic contact lens having within its optic zone, (1) a phase zone plate embracing the features of the aforementioned optical elements and (2) a pure refractive portion, preferably in the form of one or more channels.

DETAILS OF THE INVENTION

The invention finds its most favored employment in contact lenses. The invention involves incorporating the optical elements on the anterior or posterior portion, or both, of a contact lens. The optical elements may be provided on contact lenses by lathing or molding. The invention is favorably employed in multifocal (especially bifocal) intraocular lens.

The present invention relates to a diffraction bifocal optical element. It utilizes a circularly blazed diffraction grating to achieve its multifocal properties as taught by Cohen. The blazed grating allows for adjusting the split of light between two focal points by adjusting both the facet depth D and the profile of the blazed facet itself. The invention utilizes novel profiles for the facets of the optical element. The novel profiles are non-parabolic and non-linear. The shape of the profile is adjusted to the depth of the facet thereby providing maximum flexibility in lens design.

This invention embraces a diffractive multifocal optical element comprising a phase zone plate of a Cohen lens design containing rotationally symmetrical, curved repetitive patterns designed to operate at a specific wavelength and which are also curved in $r^2$ space. This means that the curvature of the profile is neither linear nor parabolic, the only profile curvatures that have been contemplated by the prior art.

In further detail, this invention is directed to a diffractive multifocal optical element comprising a phase zone plate containing rotationally symmetrical repetitive patterns (i.) designed to operate at a specific wavelength and (ii.) which (a) are periodic in accordance with $\sqrt{n}$ spacing, thus replicating the Cohen lens design, (b) have curved profiles that are also curved in $r^2$ space, thus establishing that the profiles are not linear or parabolic, (c) contain modulations (characterized by variability in lens thickness or refractive index) within the pattern sufficient to introduce a phase shift in the optical path of about $\lambda/8$ or more, where $\lambda$ is the designed wavelength, and (d) are correlated such that the light intensity at two focal points comprise, for each focal point, at least 20 percent of the incoming light at $\lambda$, and the ratio of the intensities at the two focal points is between about 0.50 and 2.00; preferably, the patterns are correlated such that the light intensity at two focal points comprise, for each focal point, at least 30 percent of the incoming light at $\lambda$ and the ratio of the intensities at the two focal points is between about 0.75 and 1.50; most preferably, the two focal points are at the $0^{th}$ and $1^{st}$ orders and the ratios of intensities is between about 0.8 to about 1.2.

The present invention relates to a diffraction bifocal optical element utilizing a circularly blazed diffraction grating to achieve its multifocal properties wherein the blazed grating allows for adjusting the split of light between two focal points by adjusting both the facet depth $D_0$ and the profile of the blazed facet itself, and the blazed facet provides an alternating inclination divided in accordance with $\sqrt{n}$ zone spacing.

The facet arrangements of the invention include dividing what in the prior art is considered a full-period ($\lambda$) spacing of the facets into alternating inclined half-period ($\lambda/2$) faceted zones that contain only one non-refractive cylindrical (or essentially cylindrical) surface for every two alternating half-period zones, and such two alternating half-period zones are interconnected by a smooth surfaced facet which effects a phase shift of the design wavelength light between the half-period zones. All of the non-refractive essentially cylindrical or cylindrical surfaces may be at any depth less than about, e.g., three design wavelengths deep, i.e., $<3\lambda$. The alternating zones of the invention provide control of the split of light between the focal points of the lens. By adjustment of the profiled inclinations of the alternating zone, it is possible to vary the intensity of light to the desired focal points.

The invention embraces a diffraction bifocal optical element superimposed on, etched into and/or embedded within a surface layer of a lens possessing the ability to independently converge light to at least two (preferably two) primary focal points in which the element comprises alternating inclined half-period ($\lambda/2$) faceted zones that contain only one non-refractive cylindrical (or essentially cylindrical) surface for every two alternating half-period zones, and such two alternating half-period zones are interconnected by a smooth surfaced facet which effects a phase shift of the design wavelength light between the half-period zones. All of the non-refractive essentially cylindrical or cylindrical surfaces are less than about, e.g., three design wavelengths deep, i.e., $<3\lambda$.

The invention provides a method by which non-parabolic zone profiles can be chosen for an effective diffraction bifocal element. The method is illustrated by the following:

1. A determination is made to either hold the light intensity values of both the $0^{th}$ and $1^{st}$ orders equal and change the depth D of the facet, e.g., hold the light intensity values of both the $0^{th}$ and $1^{st}$ orders at about 40%, or hold the value of $D_0$ and alter the intensity values of the $0^{th}$ and $1^{st}$ orders.

2. Select a transmission profile for the facets different from the generally accepted parabolic profiles.

3. Plug the equation of the new profile into the Kirchoff diffraction integral and the result is plotted for the intensity at $0^{th}$ order and $1^{st}$ order on a scale of 0 to 100% on one axis against the variation in depth of the facet, viz. $\cdot 4\lambda/\eta - 1$, etc.

4. Where the resultant curves cross one another defines a useful profile at the facet depth for the crossover point.

The Kirchoff diffraction integral, equations 1a and 1b, is useful for the condideration of a surface relief phase plate:

The Kirchoff diffraction integral, equations 1a and 1b, is useful for the condideration of a surface relief phase plate:

$$I_n = T_n \cdot T_n^* \text{ and} \tag{1a}$$

$$T_n = \int_0^{2\lambda_o d} \exp\{i\, k(\eta - 1)\Delta(p)\}\exp\{-2\pi i\, u\, p\}dp \tag{1b}$$

with $\Delta(\rho) \equiv$ surface relief profile
$\rho \equiv r^2$
$r \equiv$ radial distance outward from the center of the bifocal phase plate lens
$i \equiv \sqrt{-1}$
$k \equiv 2\pi/\lambda_o$
$\eta \equiv$ refractive index of the bifocal phase plate lens
$u \equiv -1(2\lambda_o f n) = -n/(2\lambda_o d)$ The integration of equation (1b) is taken from 0 to $2\lambda_o d$ to include both an odd and an even zone, so that the integral covers two half-period zones. From equation (1b), the transmission profile of the phase plate is characterized.

$$\exp\{i\phi\} \equiv e^{i\phi} \text{ transmission profile} \tag{2a}$$

$$\phi \equiv k(\eta-1)\Delta(\rho) \text{ phase retardation} \tag{2b}$$

In this process of generating a lens with a variable profile, a first step is to make a determination to either hold the light intensity values of both the $0^{th}$ and $1^{st}$ orders equal and change the depth D of the facet, e.g., hold the light intensity values of both the $0^{th}$ and $1^{st}$ orders at about 40%, or hold the value of $D_0$ and alter the intensity values of the $0^{th}$ and $1^{st}$ orders. This process is followed by the selection of a transmission non-parabolic profile for plugging into the equations. An illustration of this is the following:

$$\Delta(\rho) = \Delta_0 \cdot \{\tfrac{1}{2} + \tfrac{1}{2}\cdot\cos(\pi\rho/r_1^2)\} \tag{3a}$$

In the above, $\Delta_0$ represents the maximum surface relief depth of the echelette. Plugging this into the Kirchoff diffraction integral, the results are $$I_0 = J_0^2(\xi) \tag{3b}$$

$$I_1 = \{4[\sin(\xi) - \xi\cos(\xi)]/(\pi\xi^2) + J_2(\xi)\}^2 \tag{3c}$$

$$I_{-1} = \{4[\sin(\xi) - \xi\cos(\xi)]/(\pi\xi^2) - J_2(\xi)\}^2 \tag{3d}$$

$$\xi \equiv 0.5 k(\eta-1)\Delta_0/\lambda_o$$

where $J_0$ and $J_2$ are bessel function.

Plotting the results for the intensity at $0^{th}$ order and $1^{st}$ order on a scale of 0 to 100% on one axis against the variation in depth of the facet $\Delta_0$ demonstrates that one value of $\Delta_0$ equalizes the light intensity at the $0^{th}$ order and $1^{st}$ orders where the resultant curves cross one another. This value is $$\Delta_0 = 0.405 \lambda_0/(\eta-1)$$

This corresponds to a maximum phase retardation of $$\phi_0 k(\eta-1)\Delta_0 = 0.81\pi \text{ rad}$$

with light intensities at the $0^{th}$ and $1^{st}$ orders of about 40%.

A remarkable aspect of the invention is the minimal difference in inclination required in the alternating facets to achieve the benefits of excellent intensity of light at the designed focal points. For example, only a small difference in inclinations from a traditional parabolic shape is required in the half-period zones to generate a lens providing the advantages of the invention. Such small differences come about by reason of the smallness of the facets even over a full-period zone measurement. For example, one embodiment of the invention may employ in a contact lens where the phase plate is characterized as comprising 8 full-period zones and is located in the posterior surface of the lens, the lens conforms to the shape of the eye and provides a typical refraction to the distant focal point, and the design wavelength is for yellow light, about 555 nanometers, the following dimensions:

the first zone at the optical axis has a radius of about 0.75 millimeters;

the last zone away from the optical axis has a width defined by the difference in the radius to the outer periphery of the zone and the radius to the inner periphery of the zone, of about 0.14 millimeters; and the depth of each facet is about 0.003 millimeters.

This same structure, measured however, in terms of its 16 half-period zone spacings caused by a profile surfaces inflection occurring at a point at about $\sqrt{n}$ dimensions:

the first zone at the optical axis has a radius of 0.053 millimeters;

the last zone away from the optical axis has a width defined by the difference in the radius to the outer periphery of the zone and the radius to the inner periphery of the zone, of about 0.067 millimeters.

On comparing the optical elements comprising facets that have a conventional parabolic shape over full-period zone spacing to optical elements comprising the half-period zone spacing and facet profiles of the invention, utilizing the depth of the step of 0.003 millimeter, the half-period zone spacing is found to have a slightly lower area under the curves reflecting the profile of the facets. That difference can be as little as about 1% area difference to about 10% area difference. Typically the difference is about 2 to about 5% area difference. In the above illustration, the area difference is about 3%. As small as the area difference seems to be, its contribution to the performance of the lens is quite significant.

A lens having the prior art parabolic shaped echelettes, full-period spacing and with an echelette depth of $0.8\lambda/2$, provides the following light intensity distribution:

| −1 | 0 | 1 |
|---|---|---|
| .05 | .57 | .25 |

That is to be compared with the Klein and Ho description of the $\lambda/2$ analog showing the following intensities:

| m = | 3. nonalternating (b = .5) |
| --- | --- |
| −4 | .0050 |
| −3 | .0083 |
| −2 | .0162 |
| −1 | .0450 |
| 0 | .4053 |
| 1 | .4053 |
| 2 | .0450 |
| 3 | .0162 |
| 4 | .0083 |

A slight modification in the profile while maintaining the depth of 0.8 λ/2 yields a bifocal element encompassed by the invention that provides a light intensity distribution at $0^{th}$ and $1^{st}$ orders of 0.405.

In another aspect, the invention includes a diffractive multifocal optical element comprising a phase zone plate containing annular concentric zones in which the zones are spaced substantially proportional to $\sqrt{n}$, the zones possess stepped facets that introduce a discontinuity in optical path length of less than λ/2. The invention also embraces a phase zone plate containing annular concentric zones possessing facets which provide an alternating stepped repetitive pattern in accordance with $\sqrt{n}$ spacing in the optical element and wherein the depth of the steps of the facets are less than $\lambda/2(\eta' - \eta)$, where $\eta'$ and $\eta$ are the indices of refaction of the lens and the medium in which the lens is interacting and λ is the design wavelength.

In a particular embodiment of the invention, the optical element comprises facets within the annular concentric zones providing an alternating stepped repetitive pattern wherein:
1. the facet of one of the alternating zones has an inclined curved profile that is interrupted at the zone boundary by another curved profile providing the differently inclined curved facet of the other alternating zone,
2. the zones are spaced substantially proportional to $\sqrt{n}$,
3. the depth of the facets are less than λ/2.
4. the zones are cut so as to direct yellow light to at least two primary focal points in at least adequate intensities for visual usage at each such primary focal point, and,
5. but for the alternating pattern, the element would not have such intensity.

The invention encompasses a bifocal optical element of the Cohen lens design wherein the odd and even zones of the phase zone plate
a. conform to $r_n \simeq \sqrt{nd\lambda}$ spacing,
b. are contiguous and free of a non-refractive step interface at at least every other zone boundary, and leave a sloped profile at such contiguous interface,
c. the cross-section of each odd zone has the same general profile and the cross-section of each even zone has the same general profile,
d. the general profile of the odd zones is different from that of the even zones, and
e. the depth of steps for the zones are less than λ/2.
Preferably, the slope profile provides a smooth transition from zone to zone.

In another respect, the invention encompasses a bifocal optical element of the Cohen design comprising a faceted step phase zone plate containing an alternating profile wherein:

a. the phase zone plate conforms to $r_n \simeq \sqrt{2nd\lambda}$;
b. the alternating profile occurs within the full-period spacing;
c. the facets have a depth less than about λ/2;
d. the zones are cut so as to direct yellow light to at least two primary focal points in at least adequate intensity for visual usage at each such primary focal point, and
e. but for such alternating profile the zones would not have such intensity for visual usage.

In a preferred embodiment, the optical element of the invention comprises optically diffractive facets providing two different curved profiles that are joined at radii $r_n$ through transition profiles located about such radii, which transition profiles have profile curvatures that are different from said two different curved profiles whereby to form annular and concentric zones at such transition profiles which zones are spaced substantially proportional to $\sqrt{n}$ and the zones are cut so as to direct yellow light to at least two primary focal points in at least adequate intensity for visual usage at each such primary focal point, which element but for the curved profiles would not have such intensity for visual usage.

This invention relates to an ophthalmic lens such as contact and intraocular lenses containing such optical elements. In a preferred embodiment of the invention, the ophthalmic lens is a bifocal lens that splits the light to two focal points in essentially equal intensities. In a most preferred embodiment of the invention, the optical element of the lens comprises a repetitive pattern of zones having a profile embraced by the equation $$d = D_0 \cdot \{\tfrac{1}{2} + \tfrac{1}{2} \cdot \cos(\pi \cdot r^2/b^2)\}$$

were d is the depth of the repetitive profile, r is the radial position of the zone, b is the radius of the $1^{st}$ zone, and $D_0$ is the facet depth for the design wavelength.

Another aspect of the invention is the synergy and cooperative action existing between the alternating half-period zones of the invention to yield the excellent bifocal lens performance characteristics of the invention. For example, if either set of alternating zones were replicated for the other zones, thereby eliminating the alternation, the resulting lens would have a intensity distribution of parallel light and first order of the totally replicated odd zones of 0.85 and 0.075, respectively, and the totally replicated even zones of 0.885 and 0.077, respectively. When they act together, they provide a far different intensity distribution.

In one embodiment of the invention, each facet of the alternating zones of the phase zone plate has a depth less than λ/2, where λ is the design wavelength of the phase zone plate. In those cases where one zonal facet is joined by a curved profile to another zonal facet, if only one of them is formed from a step riser representing a non-refractive surface, in accordance with this embodiment, the two zonal facets will have a combined depth of less then λ/2. In this special case, and for convenience of calculations, the depth of the combination is viewed from the concept of full-period zone spacing. However, such alternating inclined zonal facets are viewed as having a variable depth. The depth of the facets may range from about 0.01 to about 0.99 times (×) λ/2, preferably about 0.05 to about 0.95×λ/2, most preferably about 0.1 to about 0.9×λ/2.

This invention makes it possible to construct a variety of facet (echelette) diffractive bifocal lenses with the requisite equal, or substantially equal, energy split between the two spherical waves going to the zeroth and first orders without being limited in facet depth.

This invention supports the novel concept that the energy split between the two emergent spherical waves is determined by a correlation of
1. facet (echelette) depths and
2. facet (echelette) profile.

It has been determined that by suitably contouring the facet (echelette) profiles an equal energy split is obtainable even when cutting a diffractive bifocal lens with facet (echelette) of any depth, assuming a reasonable limit of maximum depth of about three wavelengths, based on the design wavelength.

Figure 1:
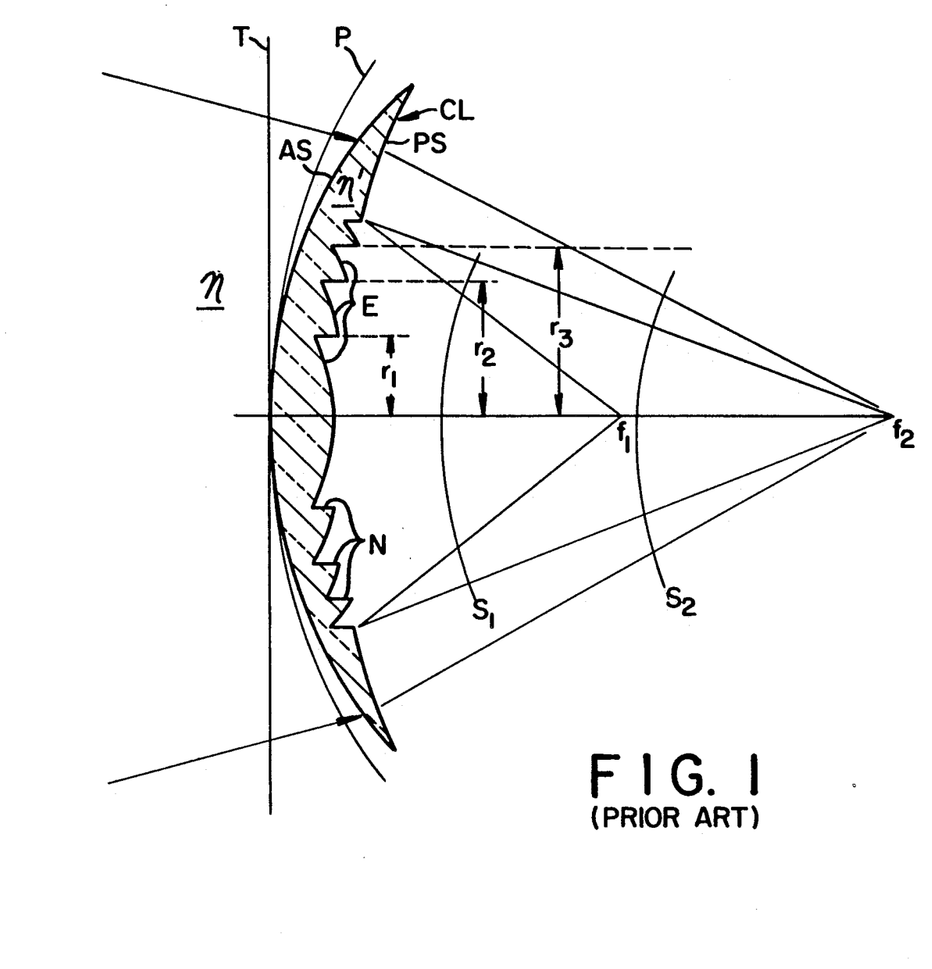
FIG. 1 illustrates as incident plane wave striking a diffractive bifocal optical element illustrating the typical parabolic shaped echelettes, having the $\sqrt{n}$ spacing pattern of the Cohen lens design, whereupon it is transformed into two (2) emergent spherical waves directed to different foci, thus depicting the general principles of multifocal diffraction.

With respect to FIG. 1, there is described a diffractive bifocal lens CL with a curvature to effect convergent refraction and diffraction. In the figure, optical elements E (predicated on a presumed full-period spacing) transform an incident plane wave into a wave front predominately of two spherical waves. For example, incident light wave with planar phase front P passes through the anterior surface AS of lens CL and emerges from the posterior surface PS as a light wave of predominately the two spherical phase fronts $S_1$ and $S_2$ with intensities $I_1$ and $I_2$, respectively. The posterior surface PS contains diffractive echelettes E and their corresponding non-optical edges N. The facet (echelette) spacing in a diffractive optical element is given by the standard formula $$r_n \simeq \sqrt{n} \cdot r_1$$

in which $r_n$ is the radius of the $n^{th}$ zone (utilizing full-period spacing). And $\eta$ and $\eta'$ are the refractive indices of air and the lens CL, respectively. The location of the focal points of the two spherical wavefronts is determined by the radius of the first zone $r_1$ and the carrier power of lens CL. In particular, the $m^{th}$ order focal point $f_m$ is given by the equation $$f_m = (r_1)^2/(2 \cdot \lambda \cdot m)$$

with $\lambda$ = wavelength; and m = 0, ±1, ±2, etc.

A desirable energy split has been suggested to occur when the two emergent spherical waves carry equal amounts of the total energy, that is, when $I_1 = I_2$. The current literature states that this is the case when the facet (echelette) depths $D_0$ are set at ½ wavelength deep (see the Klein and Ho, supra).

Figure 2:
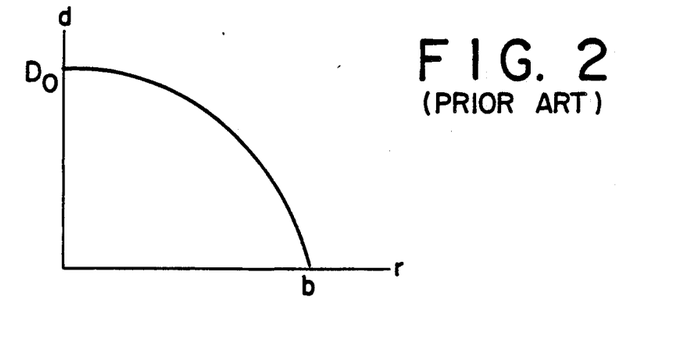
FIG. 2 is a curve illustrating the echelette profile cut from a typical prior art diffractive bifocal optical element, such as in a lens according to Ziegler, supra. The axis labeled d represents the echelette thickness and the axis labeled r represents the radial distance along the echelette.

FIG. 2 depicts a standard parabolic profile used in the prior art (see Ziegler, supra). The depth d of the repetitive profile as a function of radial position r is shown in the following equation:

$$d = D_0 \cdot (1 - r^2/b^2)$$

b = radius of the 1$^{st}$ zone

This profile is repeated in each zone, identical in $r^2$ space, but scaled down proportionally to the width of each such zone in the usual r space. The facet (echelette) depth for an equal energy split at the $0^{th}$ and 1$^{st}$ orders is shown by the following equation:

$$D_0 = 0.500 \cdot \lambda/(n-1)$$

n = index of refraction and the intensity split is given by $$I_1 = I_2 = (2.0/\pi)^2 = 0.405.$$

Figure 2A:
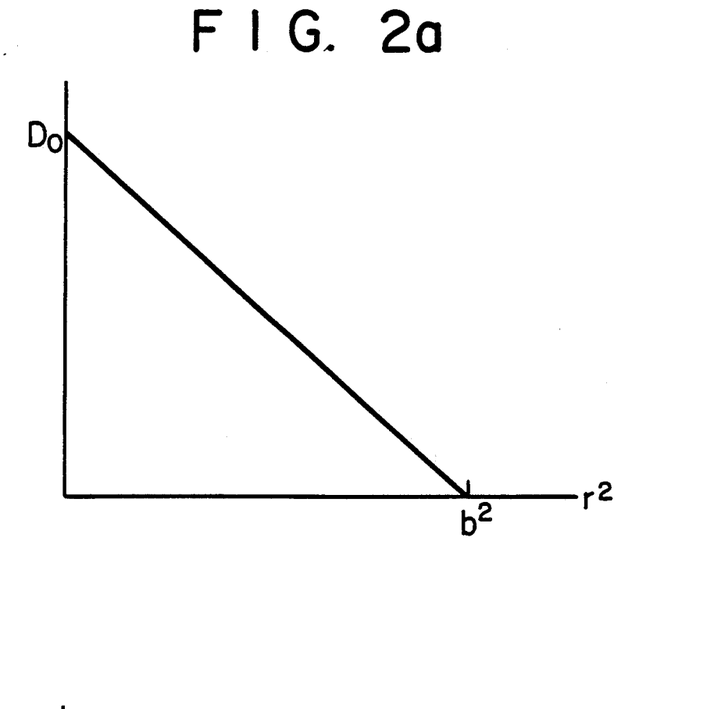
FIG. 2a is the curve of FIGS. 2 shown in $r^2$ space.
Figure 4:
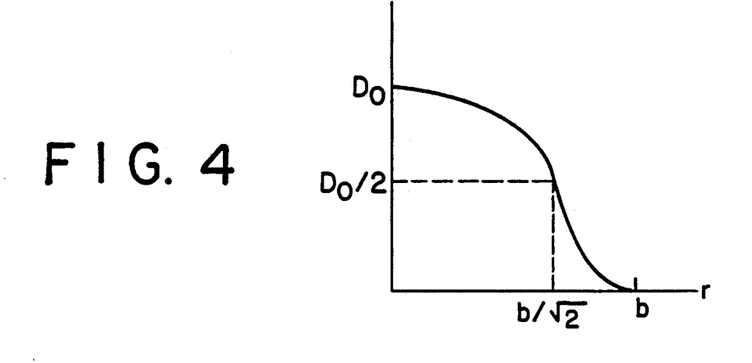
FIG. 4 is a curve illustrating a facet profile of one embodiment of the invention. The axis labeled d represents facet thicknesses and the axis labeled r represents the radial distance along the facets.
Figure 4A:
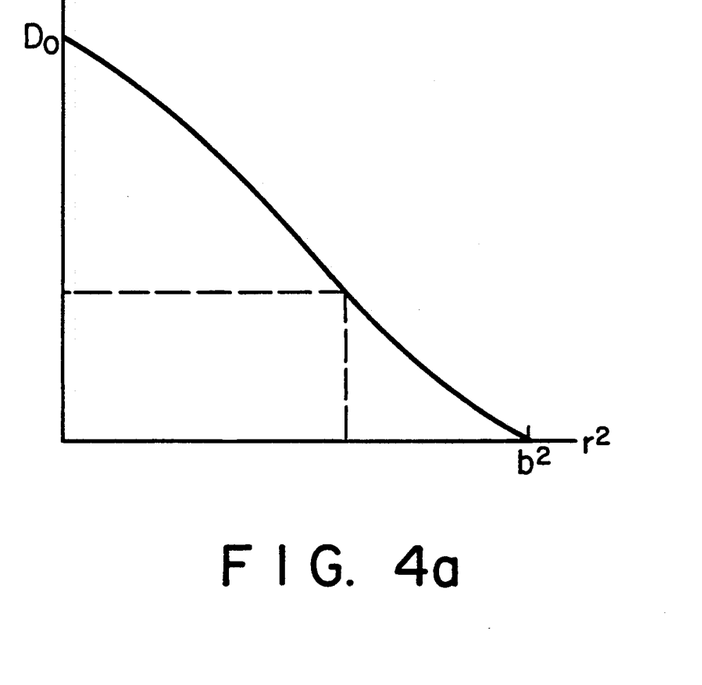
FIG. 4a is the curve of FIG. 4 shown in $r^2$ space.

FIG. 2a is the curve of FIG. 2 shown in $r^2$ space demonstrating the difference between the profiles of the prior art and those of the invention, see FIG. 4a in this respect.

Figure 3:
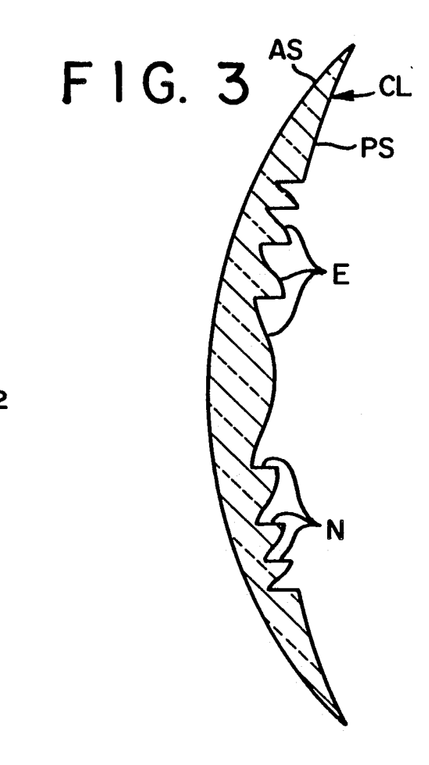
FIG. 3 is a cross-section of one embodiment of optical element in accordance with the invention, the facets of which are depicted graphically in FIG. 4.

FIG. 3 shows a diffractive bifocal optical lens containing facets according to the design illustrated in FIG. 4. The facet depths are 0.405/0.500 = 80% of the depths required by prior art lenses.

FIG. 4 illustrates a new cosine profile used in one embodiment of this invention. The repetitive profile is given by $$d = D_0 \cdot \{\tfrac{1}{2} + \tfrac{1}{2} \cdot \cos{(\pi \cdot r^2/b^2)}\}$$

The facet depth, utilizing a full-period spacing between the non-refractive edges of the steps but containing alternatingly inclined facets within half-period spacing, for an equal energy split is given by $$D_0 = 0.405 \cdot \lambda/(n-1)$$

and the intensity split is given by $$I_1 = I_2 = J_0^2(0.405 \cdot \pi) = 0.403$$

where $J_0$ is a bessel function.

FIG. 4a illustrates the curve of FIG. 4 in $r^2$ space demonstrating that the profiles of the phase plates of the invention retain some of their curvature even in $r^2$ space as contrasted with the phase plates of the prior art which lose all curvature in $r^2$ space, see FIG. 2a in this respect.

FIG. 3 comprises an optical lens CL possessing anterior surface AS and peripheral posterior surface PS. In this embodiment the posterior surface of the optic zone is comprised of the diffractive facets (echelettes) E and their corresponding non-optical edges N. The physical profile of the facets (echelettes) E is given by $$d = D_0 \cdot \{\tfrac{1}{2} + \tfrac{1}{2} \cdot \cos{(\pi \cdot r^2/b^2)}\}$$

where d is the thickness of the facet (echelette), r is the radial distance from the inner edge of the zone (and such profile is repeated in each zone but scaled down proportionally to the width of each such zone) within which the facet (echelette) is formed and the occurrence of such profile alternation, and b is the radius of the first zone. This particular profile is drawn in FIG. 4.

Figure 5:
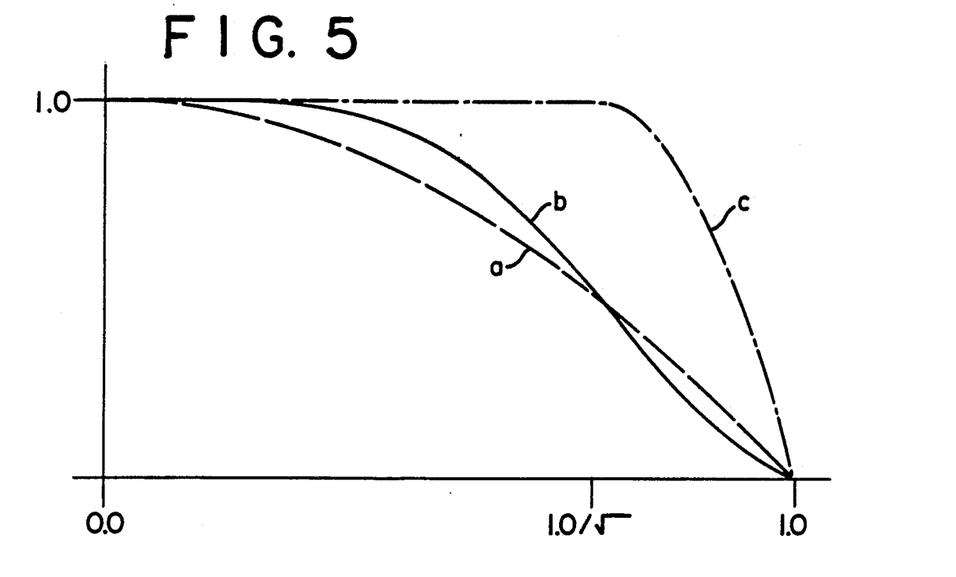
FIG. 5 compares the graphical profiles of the full-period spaced echelette zone of the prior art possessing the conventional parabolic profile and the half-period spaced facet zones containing a multi-profile interrupted structure.

FIG. 5 is an overlay of the parabolic echelette design a characteristic of the prior art (see FIG. 2), the cosine profile b of FIG. 4 and another useable profile c for a bifocal lens. The purpose of the overlay is to illustrate the profile differences between the structures of the invention and the prior art. Note particularly the shift in profile of curve b at the $\sqrt{n}$ spacing. That small difference allows the profile of curve b to be suitably employable as the facet profile for the lens element of the invention.

The physical profile of the facet c is given by $$y = 1 - \{(r - 1/\sqrt{2})/(1 - 1/\sqrt{2})\}$$

Profiles a and c at such reduced depth fail to give an equal intensity split of the light to the $0^{th}$ and 1$^{st}$ orders whereas they do when $$D_0 = 0.500 \cdot \lambda/(n-1).$$

FIGS. 6 through 10 depict a variety of useful facet profiles that can be used according to the invention in the lens construction of FIG. 2.

Figure 6:
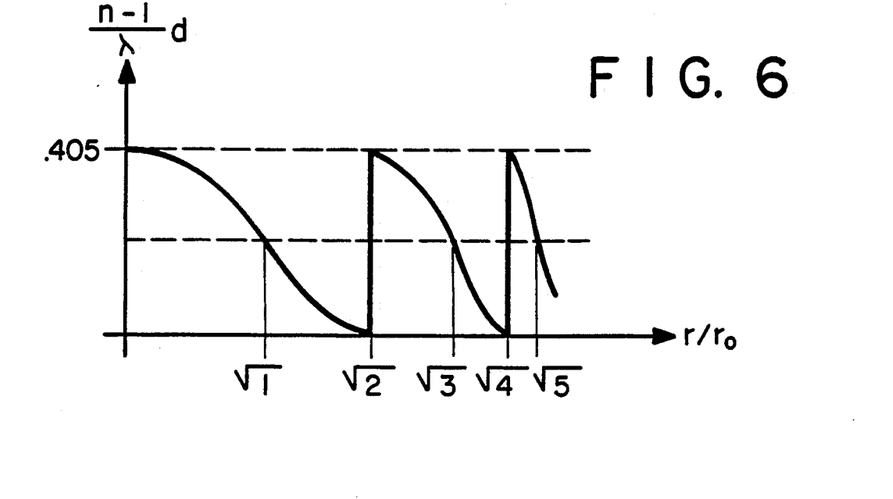
FIGS. 6 through 13 provide graphical depictions of cross-sectional views of a variety of facet arrangements for optical elements within the scope of this invention.

FIG. 6 graphically depicts along an x-y axis the profile of FIG. 4 in a repetitive sequence of alternating half-period inclined zones represented by the odd and the even zones. This particular embodiment is characterized by $$y = 0.405\lambda/(n-1) \cdot \{\tfrac{1}{2} + \tfrac{1}{2}\cos(\pi r^2/2r_0^2)\}$$

$$I_0 = I_1 = 0.402$$

wherein $\lambda$ is the designed wavelength and n is the index of refraction of the lens medium.

Figure 7:
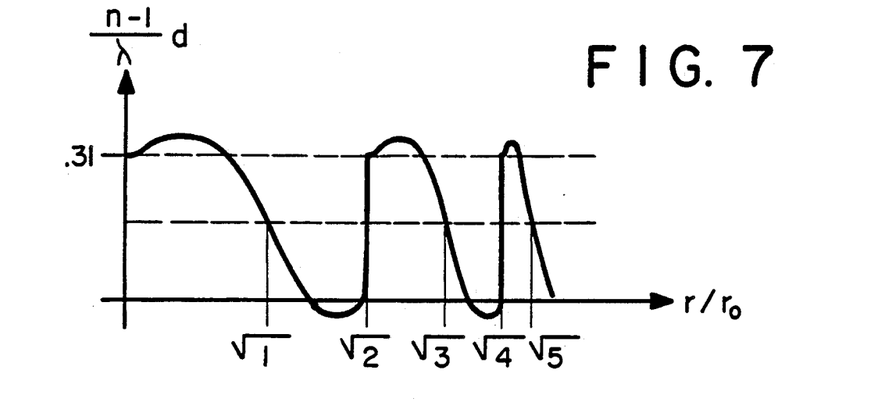

FIG. 7 is another profile graphically depicted along an x-y axis in which the depth of the non-refractive edges of the step are further reduced to $0.31\lambda$ and the depth of the even half-period zones have a curved connection with the non-refractive edge. This embodiment of the invention is characterized by $$y = 0.314\lambda/(n-1) \cdot 2.5\{\tfrac{1}{2} + \tfrac{1}{2}\cos(\pi r^2/2r_0^2)\} - 0.314\lambda/(n-1) \cdot 1.5\{1 - r^2/2r_0^2\}$$

$$I_0 = I_1 = 0.390$$

Figure 8:
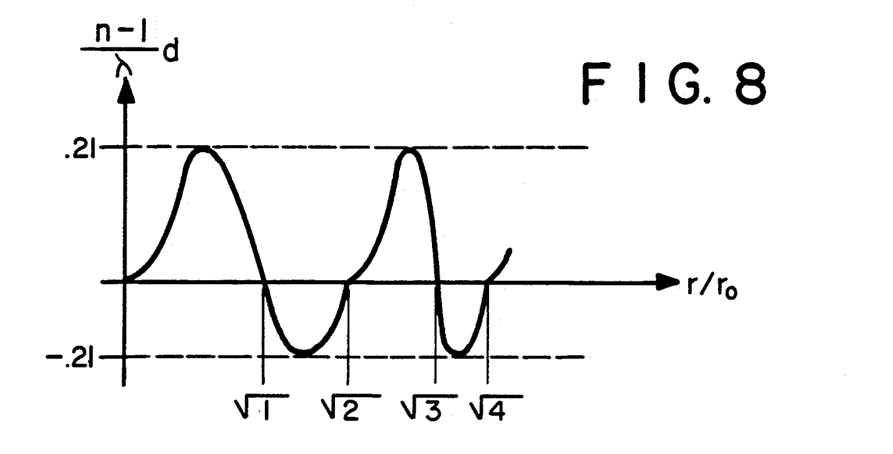

FIG. 8 shows a profile where the edge of the step is inclined, suggesting that it contributes to the optical quality of the phase zone plate. The profiles of the half-period alternating zones in this embodiment are different from the preceding designs, mainly because the non-refractive edge has been substantially removed. This embodiment is characterized by $$y = \lambda/(n-1)\{r^2/r_0^2 + \cos(\pi r^2/r_0^2) - 1\}$$

$$I_0 = I_1 = 0.314$$

It is to be noted in this embodiment that the depths of the facets for the odd zones were further reduced to $0.21\lambda$ but the even zones have a depth below the nadir of the odd zones by another $0.21\lambda$.

Figure 9:
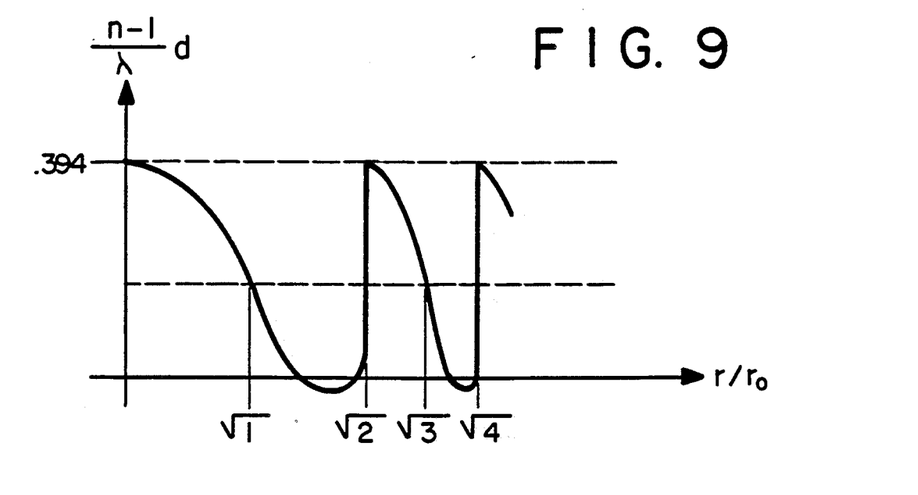

FIG. 9 shows a faceted profile where the inclination of the even zones have a bottom curvature which presents two opposite-facing curves before connecting with the non-refractive edge of the step, this embodiment of the invention is characterized by $$y = 0.394\lambda/(n-1)\{0.287 + 0.731 J_0(4.20 \cdot r^2/2r_0^2)\}$$

$$I_0 = I_1 = 0.402$$

wherein $J_0$ is a bessel function.

Figure 10:
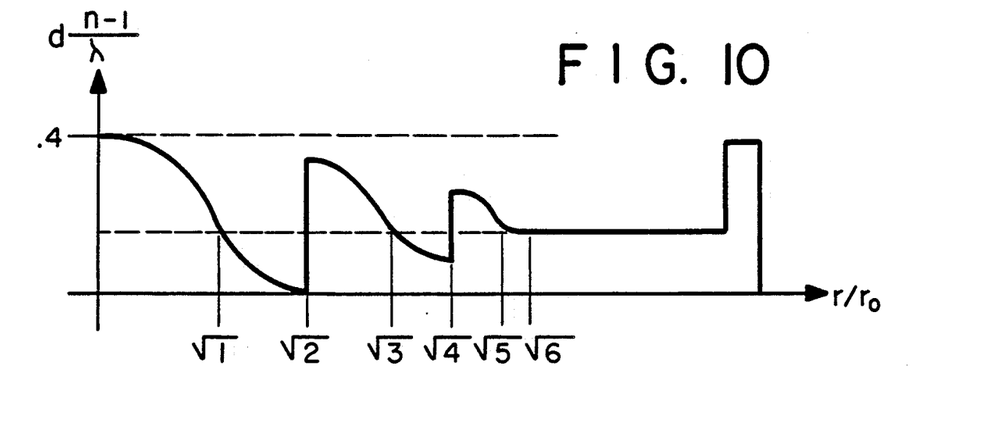

FIG. 10 shows another facet profile that incorporates two phase zone plates and a pure refractive portion. In this embodiment, there is a decrease in depth from full-period zone to full-period zone, though it is not necessary for the decrease to exist throughout the optic zone. For example, the first half of the full-period zones of the optic zone may be only one depth, and the second half of the full-period zones may be progressively reduced in depth. In the preferred modes of such embodiments, each of the steps, whether of the same or different depth, is equally divided along a common plane of the optic zone. The pure refractive portion is preferably in the form of one or more channels which may be incorporated within the optic zone and/or circumscribing the optic zone. The particular embodiment of FIG. 10 is characterized by $$y = a\lambda/(n-1)\{\tfrac{1}{2} + \tfrac{1}{2}\cos \pi/2 \cdot r^2/r_0^2\}$$

where $a$ decreases from zone to zone

Figure 11:
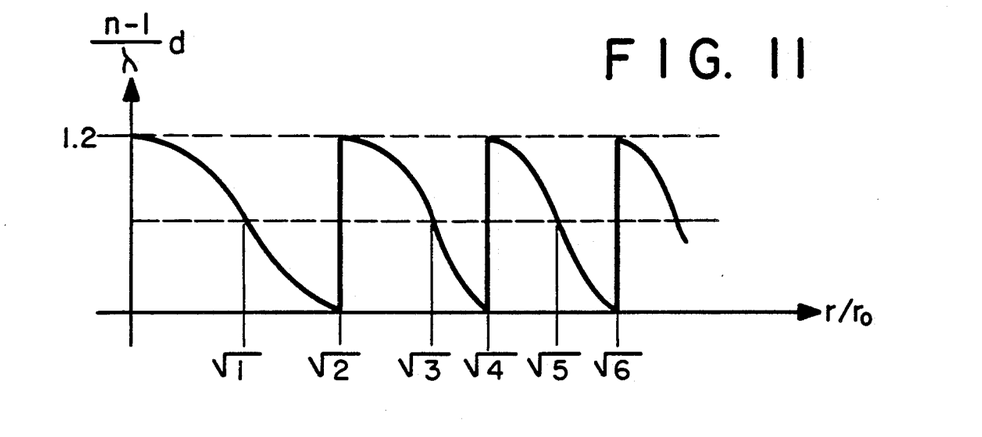

FIG. 11 illustrates a phase zone plate design in which the depth of the echelettes is greater than $\lambda$, in this case $1.2\lambda$. The shape of the profile is a cosine configuration. This embodiment of the configuration of FIG. 11 is characterized by $$y = 1.2\lambda/(n-1)\{\tfrac{1}{2} + \tfrac{1}{2}\cos \pi/2 \cdot r^2/r_0^2\}$$

$$I_0 = 0.404 \quad I_1 = 0.358$$

Figure 12:
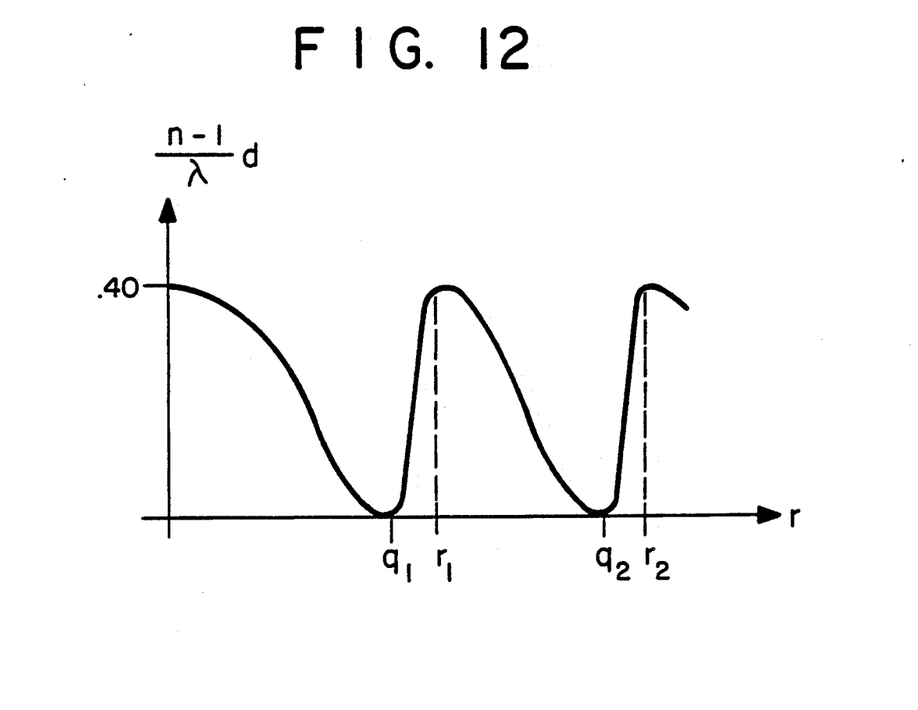
Figure 13:
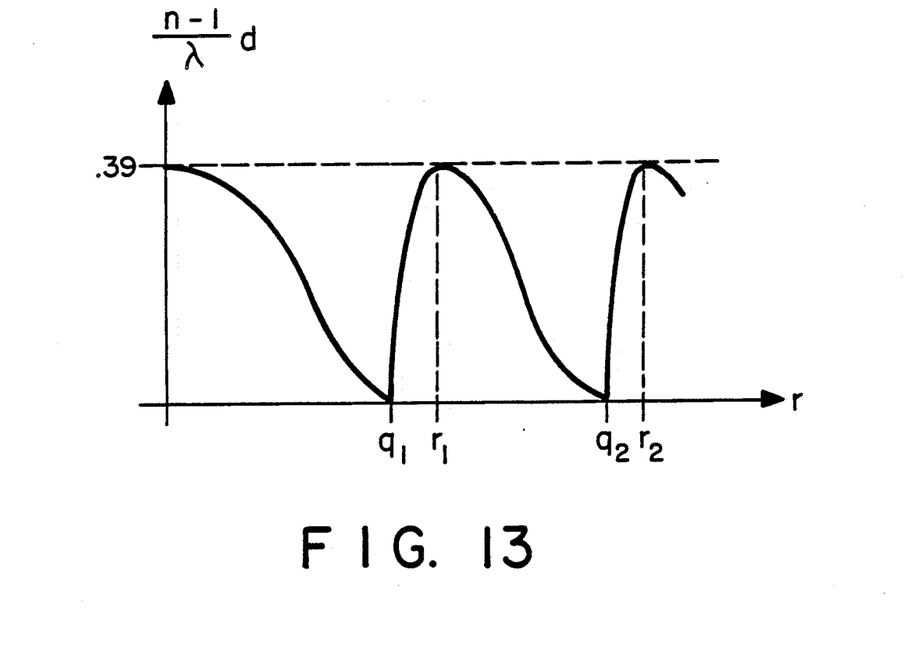

The faceted profiles of FIGS. 12 and 13 introduce a space reduction in the full period zone at $q_1$ which allows the step to proceed from $q_1$ to $r_2$, etc. This space reduction in the alternating zone is not regarded to alter the $\sqrt{n}$ spacing of the zones. FIG. 12 is characterized by $$y_n = 0.40 \{\tfrac{1}{2} + \tfrac{1}{2}\cos[\pi(r^2 - r_{n-1}^2)/(q_n^2 - r_n^2)]\}$$

where $r_{n-1} < r < q_n$ $$y_n = 0.40\{\tfrac{1}{2} + \tfrac{1}{2}\sin[\pi(r^2 - (r_n^2 + q_n^2)/2)/(r_n^2 - q_n^2)]\}$$

where $q_n < r < r_{n-1}$ $$r_n \simeq \sqrt{2nd\lambda}$$

$$q_n^2 = r_{n-1}^2 + (r_n^2 - r_{n-1}^2)/a^2$$

$$a = 1.086$$

FIG. 13 is characterized $$y_n = 0.39\{\tfrac{1}{2} + \tfrac{1}{2}\cos[\pi(r^2 - r_{n-1}^2)/(q_n^2 - r_n^2)]\}$$

where $r_{n-1} < r < q_n$ $$y_n = 0.39\{1 - (r - r_n)^2/(r_n - q_n)^2\}$$

where $q_n < r < r_n$ $$r_n \simeq \sqrt{2nd\lambda}$$

$$q_n^2 = r_{n-1}^2 + (r_n^2 - r_{n-1}^2)/a^2$$

$$a = 1.086$$

It should be appreciated that the invention is not limited to the exact details of construction shown and described herein for many obvious modifications will occur to persons skilled in the art. The variety of curved profile shaped of the facets is not limited to those specifically illustrated. It should be apparent that many other curved profiles are suitably employable to manufacture optical elements possessing effective splits of the light intensities to the zeroth and first orders to serve as useful bifocal optical elements.

I claim:

1. A diffractive multifocal optical element comprising a phase zone plate of a Cohen lens design containing rotationally symmetrical, curved repetitive patterns designed to operate at a specific wavelength and which are also curved in $r^2$ space.

2. The diffractive multifocal optical element of claim 1 including at least two phase zone plates within its optic zone.

3. The diffractive multifocal optical element of claim 1 including a pure refractive portion.

4. The diffractive multifocal optical element of claim 1 in the form of an ophthalmic lens.

5. The ophthalmic lens of claim 4 in the form of one of a contact lens and an intraocular lens.

6. The diffractive multifocal optical element of claim 2 in the form of an ophthalmic lens.

7. The ophthalmic lens in claim 6 in the form of one of a contact lens and an intraocular lenses.

8. The diffractive multifocal optical element of claim 3 in the form of an ophthalmic lens.

9. The ophthalmic lens of claim 8 in the form of one of a contact lens and an intraocular lenses.

10. A diffractive multifocal optical element comprising a phase zone plate containing rotationally symmetrical repetitive patterns (i.) designed to operate at a specific wavelength and (ii.) which
   (a) are periodic in accordance with $\sqrt{n}$ spacing, where n is an integer representing the zone number,
   (b) have profiles that are curved in $r^2$ space,
   (c) contain modulations within the pattern sufficient to introduce a phase shift in the optical path of about $\lambda/8$ or more, where $\lambda$ is the designed wavelength, and
   (d) are correlated such that the light intensity at two focal points comprise, for each focal point, at least 20 percent of the incoming light at $\lambda$, and the ratio of the intensities at the two focal points is between about 0.5 and 2.00.

11. The diffractive multifocal optical element of claim 10 in the form of an ophthalmic lens.

12. The ophthalmic lens of claim 11 in the form of one of a contact lens and an intraocular lens.

13. A diffractive multifocal optical element comprising a phase zone plate of a Cohen lens design containing correlated rotationally symmetrical, curved repetitive patterns designed to operate at a specific wavelength, which curved repetitive patterns are curved as well in $r^2$ space and the variability in thickness or the refractive index of the repetitive patterns are correlated such that the light intensity at two focal points comprise, for each focal point, at least 20 percent of the incoming light at $\lambda$, and the ratio of the intensities at the two focal points is between about 0.5 and 2.00.

14. A method for making a phase zone plate containing non-parabolic zone profiles to provide a diffraction bifocal element which comprises:
   (a) characterize a desired light intensity values for the $0^{th}$ and $1^{st}$ orders and a transmission profile for the facets different from the generally accepted parabolic profiles,
   (b) plug the equation of the new profile into the Kirchoff diffraction integral and plot the result for the intensity at $0^{th}$ order and $1^{st}$ order on a scale of 0 to 100% on one axis against the variation in depth of the facet,
   (c) determine where the resultant curves cross one another to define a useful profile at the facet depth for the crossover point, and
   (d) shape a lens with a phase zone plate in conformity with such defined profile.

15. A multifocal optical element comprising:
   a phase zone plate including a plurality of zones spaced in proportion to the square root of n, where n is the zone number; and
   each of said plurality of zones including a profile that is curved in $r^2$ space.

16. The multifocal optical element as claimed in claim 15 in the form of an ophthalmic lens.

17. The multifocal optical element as claimed in claim 16 wherein the ophthalmic lens is in the form of one of a contact lens and an intraocular lens.

* * * * *